United States Patent [19]
Esch

[11] 3,948,331
[45] Apr. 6, 1976

[54] TRACK ASSEMBLY FOR SNOWMOBILES

[75] Inventor: Richard E. Esch, Sparta, Mich.

[73] Assignee: C. L. Frost & Son, Inc., Grand Rapids, Mich.

[22] Filed: June 11, 1974

[21] Appl. No.: 478,346

Related U.S. Application Data

[63] Continuation-in-part of Ser. No. 383,690, July 30, 1973, Pat. No. 3,893,526.

[52] U.S. Cl.................. 180/5 R; 305/24; 305/30
[51] Int. Cl.².......................................... B62D 57/02
[58] Field of Search .......... 180/5 R; 305/23, 24, 25, 305/27, 28, 30, 32

[56] References Cited
UNITED STATES PATENTS

| | | | |
|---|---|---|---|
| 2,996,338 | 8/1961 | Hill | 305/25 |
| 3,527,505 | 9/1970 | Hetteen | 180/5 R |
| 3,527,506 | 9/1970 | Erickson | 180/5 R |

Primary Examiner—Philip Goodman
Assistant Examiner—John A. Carroll
Attorney, Agent, or Firm—Price, Heneveld, Huizenga & Cooper

[57] ABSTRACT

Apparatus for adjustably mounting bogie wheels on a frame member or slide rail of an endless track assembly for snowmobiles. The apparatus includes coaxial pairs of bogie wheels on each rail, one wheel mounted on either side of said rail, each of such pairs being independent of all other wheels and rails in the assembly. The bogie wheels are adjustable to convert the assembly from one in which the track slides along the rail to one in which the track is spaced below the rail by said bogie wheels. The length of the track engaging the supporting snow surface is also adjustable. Various means for adjusting the bogie wheels with respect to the rail are provided including a bogie wheel axle mounting cylinder having a plurality of ridges about its circumference received in a mounting block on the track rail. The cylinder is inserted in any of a plurality of positions in the block to position the axle, the ridges holding the cylinder and axle as desired.

15 Claims, 17 Drawing Figures

TRACK ASSEMBLY FOR SNOWMOBILES

CROSS REFERENCE TO RELATED APPLICATION

This application is a continuation-in-part of my previously filed application Ser. No. 383,690, entitled TRACK ASSEMBLY FOR SNOWMOBILES, filed July 30, 1973, now U.S. Pat. No. 3,893,526.

BACKGROUND OF THE INVENTION

This invention relates to endless track assemblies for smowmobiles and, more particularly, to apparatus for mounting bogie wheels for spacing the endless track from the frame members or slide rails of such an assembly.

Generally, snowmobiles and other similar multiterrain vehicles utilize endless track assemblies for obtaining movement over snow or other supporting surfaces. The flexible endless tracks are supported on framewoks having idler wheels at either end thereof around which the track is driven in a closed path. Two types of supporting systems are typically used to support the track between the sets of idler wheels. In the pure rail system, parallel slide rails slidingly engage the inside surface of the endless track and force it against the supporting surface. In the pure bogie system, a plurality of small wheels or bogie wheels space the track away from the intermediate supporting framework of the assembly. Combinations of these two systems have also been used wherein bogie wheels are supported on continuous axles extending between the two parallel rail members or wherein a series of single bogie wheels extends from the laterally outward sides of the rails along their length. Each of these various supporting systems has its own advantages and disadvantages.

Although the pure rail systems provide greater lateral stability for the snowmobile since such systems are generally utilized with tracks including devices which keep the track in alignment with the slidably engaged rail, the pure bogie systems generally require a smaller amount of horsepower to produce the same speed as in a corresponding sled using the pure rail system since the bogie wheels minimize the frictional contact between the endless track and its supporting framework. Several attempts have been made to use the best of both of these systems in combination bogie-rail systems. However, prior known combination systems have rigidified the track assembly, thereby reducing its all-terrain efficiency. More importantly, the bogie wheel arrangements in certain of the prior known combination systems have allowed the sliding surfaces of the slide rails to deteriorate and wear unevenly. Such wear impairs both the handling and performance characteristics of the sled therefore necessitating more frequent maintenance and repair.

Additionally, the preveiously known track supporting systems have necessitated a constant amount of track in contact with the supporting snow surface. It has been founr dhat a greater amount of track in contact with the supporting surface produces better handling in conditions of ice, high speeds along straight paths and in deep, heavy snow because of the greater frictional contact, greater stability, and greater surface area produced thereby. Conversely, a lesser amount of track in contact with the supporting surface enables quicker starts, the handling of more varied terrin, and a greater speed from a given size engine because of the reduced drag or friction on the track. Conversion between these two types of track configurations has heretofore been extremely difficult and time-consuming because of the extensive modification required to modify the prior known track assemblies such as those described above.

SUMMARY OF THE INVENTION

Accordingly, it is the purpose of the present invention to provide an endless track assembly for snowmobiles and like vehicles combining the best aspects of both the pure bogie and the pure rail supporting systems. The apparatus includes bogie wheels arranged on the slide rails or frame members of the track assembly for support of the endless track while preventing wear on the sliding surfaces of the rails by the track. The system enables conversion from a pure bogie system wherein the frictional contact between the bottom of the slide rail and the endless track is eliminated but wherein the lateral support of portions of the endless track against the sides of the slide rail is retained. Further, the system's quick and convenient adjustment provides a pure rail system for situations in which the use of that system is desirable. Moreover, the system is designed to allow adjustment of the amount of track in contact twith the supporting snow surface thereby making the track assembly easily adaptable fo a wide range of handling situations including both racing and trail use. All of these conversions and adjustments may be made easily without major modification of the structural elements of the assembly.

In accordance with the invention, I provide a means for adjusting a bogie wheel or bogie wheels with respect to the bottom surface of a rail frame member or the sliding surface of a slide rail of a snowmobile track assembly in order to selectively space the track ast various distances from the rail bottom or sliding surface or to allow the track to contact the sliding surface. Means are also provided for adjusting the positions and space between the various bogie wheels along the length of the rails or frame members.

In the preferred embodiment, the apparatus provides a plurality of pairs of bogie wheels adjustably mounted at intervals along the length of each of the parallel frame members or slide rails included in the endless track assembly. Each pair of bogie wheels is mounted on one frame member or rail independently of the other rail, the wheels being coaxial and positioned on either side of the single rail. Each pair of wheels spaces the endless track below the slide rail to prevent frictional contact therewith but allows lateral engagement of guide means extending from the track with the sides of the rail to maintain lateral alignment of the track with the rail.

Means are included to adjust the pairs of bogie wheels above and below the level of the slide rail bottom to convert the assembly from the bogie system to the pure rail system. The front ends of the parallel rails may also be curved upwardly. A bogie wheel pair positioned along this curved section may be raised and lowered to adjust the amount of track in contact with the supporting snow surface. Further, means are included to allow the slidable adjustment of the pair of bogie wheels longitudinally along the length of the frame members or slide rails.

One particular embodiment of the bogie wheel adjustment means includes a mounting cylinder having a plurality of ridges about its circumference received in a mounting block on the track rail. An axle is offset from the cylinder axis. The cylinder is inserted in any of a plurality of positions in the block to position the axle, the ridges holding the cylinder and axle as desired to space the bogie wheels at various distances from the slide rail.

These and other objects, advantages, purpose and features of the invention will become more apparent from a sutdy of the following description taken in conjunction with the drawings.

DESCRIPTION OF THE PREFERRED EMBODIMENT

Figure 1:
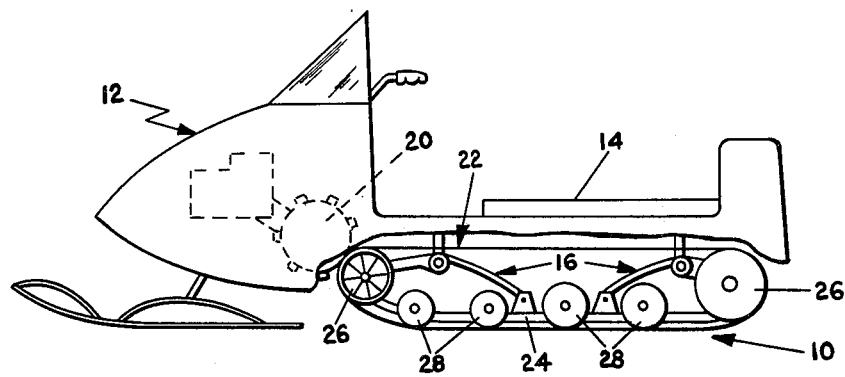
FIG. 1 is a fragment side view of a snowmobile including the track assembly of the present invention.
Figure 2:
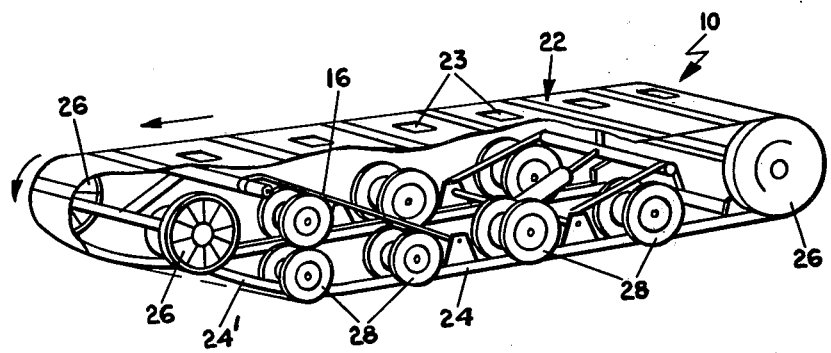
FIG. 2 is a perspective view of the track assembly with portions of the flexible endless track and suspension of the assembly broken away.

Referring now to FIGS. 1 and 2, the track assembly 10 of the present invention is shown mounted under the rear portion 14 of a snowmobile 12. The track assembly 10 includes shock-absorbing and suspension means 16 for supporting the body of the snowmobile 12. An endless, flexible track or belt 22 is supported for movement longitudinally around a pair of spaced, elongated frame members or slide rails 24 in the direction illustrated, the frame members 24 including a pair of track supporting idler wheels 26 mounted on suitable mounting supports at either end thereof. The front portions of rails 24 may be curved or bent upwardly as shown in order to enhance movement over the snow and other terrain. Typically, idler wheels 26 are mounted coaxially on the same continuous axle outboard of the outer side surface of frame members or rails 24. The positions of idler wheels 26 may be adjusted slightly to maintain the proper tension on the flexible track 22. The track is typically driven in its closed loop path to provide movement of the sled over the supporting snow surface by an engine 18 connected to toothed drive or cog wheels 20. The teeth of the cog wheels 20 in turn engage spaced holes 23 which are in alignment with slide rails or frame members 24. Holes 23 include lugs 70 (FIGS. 3, 7, and 8) which maintain longitudinal alignment of the track and rails in one embodiment of the invention as will be more fully explained below.

As mentioned above, there are two conventional types of systems supporting the track 22 between the sets of idler wheels 26. In the pure rail system, the slide rails 24 contact the inside surface of the flexible track 22 and maintain it in contact with the supporting snow surface. In the pure bogie system, a plurality of bogie wheels 28 are mounted on slide rails or frame members to support the inside surface or another portion of the flexible track away from the rails or frame thereby rotatably supporting the track against the supporting snow surface. As will be more fully described below, the present invention provides a track assembly which may be converted between the pure rail and pure bogie systems as well as providing a means for adjusting several other performance characteristics of the snowmobile via a quick and convenient adjustment to the bogie wheel mounting assemblies.

Figure 3:
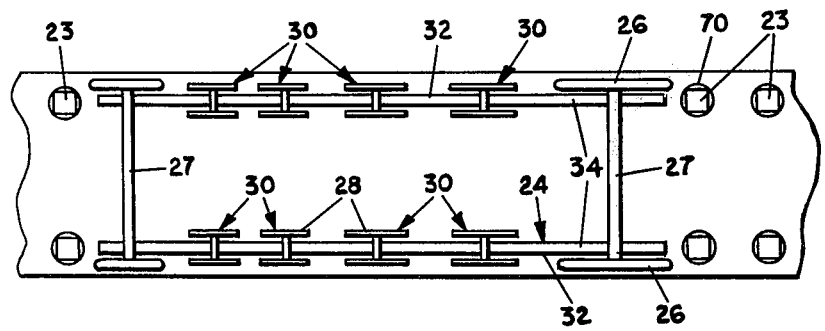
FIG. 3 is a plan view of the specific arrangement of the bogie wheels in the present invention for supporting the flexible endless track between the idler wheels.

Referring now to FIG. 3, the specific bogie wheel arrangement of the present invention is shown including a plurality of individual bogie wheel units or assemblies 30 mounted intermediate the sets of idler wheels 26 along the lengths of elongated frame members or rails 24. Each unit or assembly 30 includes a pair of bogie wheels 28 mounted coaxially with one another adjacent both the laterally outside and laterally inside surfaces 3 and 34 respectively of rails 24. Each unit is adjustably mounted on only one of the frame members 24 such that its position may be adjusted longitudinally of the rail while the vertical position of the pairs of wheels 28 included therein may be adjusted vertically with respect to the bottom of the rails.

Figure 8:
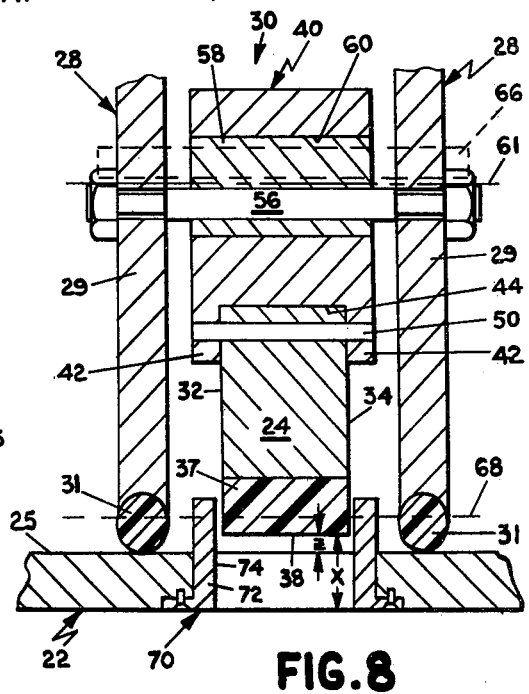
FIG. 8 is a cross-sectional view of the mounting means and bogie wheels taken along the plane VIII—VIII of FIG. 7.

In the preferred embodiment, rails 24 include a low friction sliding material 37 adhered, riveted or otherwise secured to the bottom thereof to provide a relatively friction-free sliding surface 38 along the bottom of the rail. In the preferred embodiment, sliding material 37 is a high density polyethylene known generally in the trade as "Hi-fax." The Hi-fax material extends downwardly in vertical alignment with the driving holes 23 on each lateral side of the track 22 as shown in FIG. 8. As will be more fully explained below, the Hi-fax surface 38 allows the track to freely slide along the rails when the assembly is adjusted to allow contact between the track and rails.

Each of the pairs of the bogie wheels 28 in the preferred embodiment is independent of the other parallel rail or frame member 24 on separate axles although the idler wheels 26 may be mounted on continuous axles 27 as illustrated. The individual mounting of the independent pairs of bogie wheels 28 provides greater flexibility for the track assembly 10 such that it may more easily encounter and more effectively accommodate varying terrains over which the snowmobile is guided. More importantly, however, the coaxial pairing of the bogie wheels 28 on either side of the frame member 24 prevents uneven wear of the sliding surface of slide rails 24 with the inside surface of flexible track 22. The pairing arrangement also provides better and more efficient support of the track in the area where it contacts the snow or other supporting surface.

Figure 5:
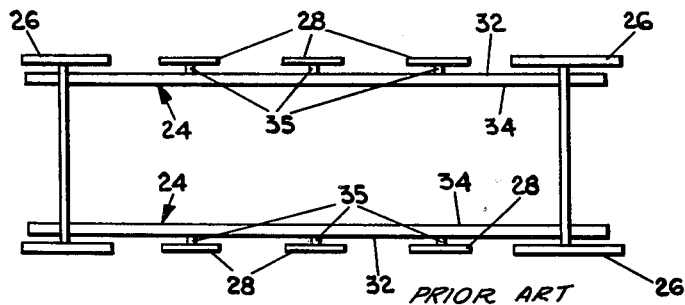
FIG. 5 is a plan view of the specific arrangement of the supporting wheels of another prior known track assembly.

The problem of uneven wear on the sliding surface of rails 24 is more readily appreciated with reference to one prior known system utilized in connection with snowmobile track assemblies. As shown in FIG. 5, a plurality of bogie wheels 28 are supported on stub axles 35 welded to the laterally outside surfaces 32 of the parallel rails 24 between the sets of idle wheels 26. This arrangement leaves the corner between the inside edge or surface 34 and the bottom of the slide rail 24 in contact with the flexible track 22 along the entire ground-engaging run of the track. This results in uneven wear of the sliding surface of the rail. Such uneven wear greatly diminishes the stability and handling characteristics of a snowmobile especially if the wear is allowed to continue and become severe. It also necessitates frequent repair or replacement of the sliding surfaces.

Figure 7:
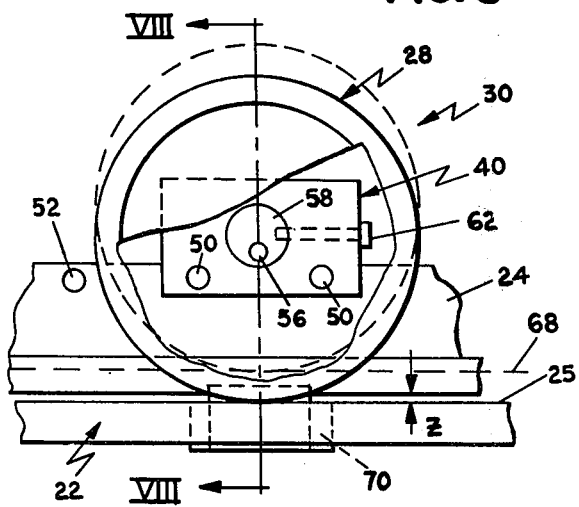
FIG. 7 is a fragmentary side elevation with portionsn broken away showing one embodiment of the specific means for mounting the pairs of bogie wheels on the individual frame members.
Figure 9:
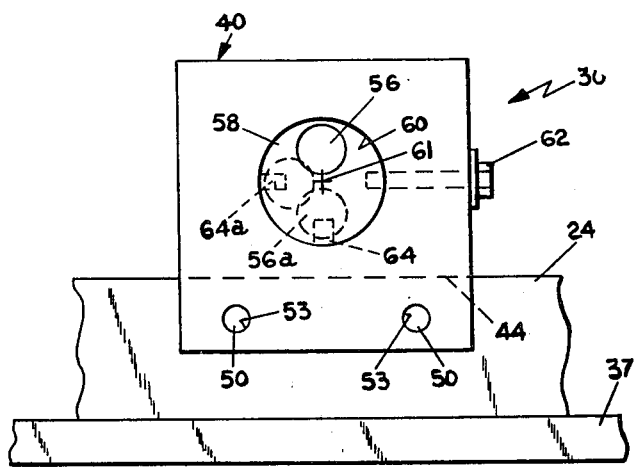
FIG. 9 is an enlarged side elevation of the embodiment of the bogie wheel eccctric mounting assembly shown in FIGS. 7 and 8.

Referring now to FIGS. 7, 8, and 9, a first embodiment of the specific supporting units 30 for the individual pairs of bogie wheels 28 in the present invention is shown. Each unit 30 comprises a mounting block 40 which is slidably supported on a single frame member or rail 24. In the preferred embodiment, each rail 24 has a generally rectangular cross-sectional shape while the block 40 includes two downwardly extending flanges 42 (FIG. 8) extending along the entire lateral edges of the block. Flanges 42 define a rail-receiving elongated channel 44 therebetween. The top portion of rail 24 is slidably received in channel 44 such that the entire block including the axle and bogie wheels is slidable longitudinally along the entire length of rail 24. A plurality of spaced apertures 52 along the upper portion of rail 24 (FIG. 7) are spaced to correspond to the spacing of apertures 53 extending through flanges 42 in block 40. Two securing pins 50 are fitted through apertures 52 and 53 when they are properly aligned to secure the block 40 in various positions along the length of the rail 24. Pins 50 are preferably tightly press fitted through the apertures but may include securing means such as threaded nuts on the ends thereof to retain them in place.

In order to allow conversion between the pure rail and pure bogie systems, each unit 30 includes apparatus for adjusting the position of the bogie wheels with respect to the bottoms of rails 24. Bogie wheels 28 including rims 29 and rubber tires 31 are rotatably mounted on an axle 56 which extends eccentrically through an axle-retaining cylinder 58. Cylinder 58 is rotatably received within an aperture 60 extending transversely of the block 40 such that the cylinder 58 has an axis of rotation perpendicular to the direction of longitudinal channel 44. Axle 56 may comprise a single axle extending eccentrically through the cylinder 58 (FIG. 8) or may comprise cylindrical extensions extending eccentrically from either end of cylinder 58 on either side of the mounting block 40. A cylinder securing bolt 62 is threadedly received in one of a plurality of threaded holes 64 extending radially inwardly from various circumferential positions on cylinder 58 for alignment with bolt 62. Bolt 62 secures the cylinder 58 and axle 56 in one of several rotational positions as shown in FIG. 9. For example, threading bolt 62 into hole 64a retains axle 56 in position 56a. The rotational position may be changed by unscrewing bolt 62, rotating cylinder 58 such that another of the threaded holes 64 is in alignment with bolt 62, the bolt then being rethreaded into the newly aligned hole.

As will now be appreciated, the eccentric position of axle 56 with respect to the axis of rotation 61 of cylinder 58 allows bogie wheels 28 to be adjusted to space the exterior surface 25 of flexible track 22 away from the bottom sliding surfaces 38 of rails 24 a predetermined distance X as shown in FIGS. 7 and 8. The position of the bottom of bogie wheels 28 may be changed in the manner described above thereby adjusting the spacing X as well as the space Z between the sliding surface 48 and surface 25. When the bolt 62 is unscrewed and the cylinder 58 is rotated such that axle 56 is at its upwardmost position, i.e., closest to the top of aperture 60, the bottoms of bogie wheels 28 are moved out of contact with surface 25 of track 22 such that axle 56 is at position 66 and the bottom of wheels 28 are in a plane labeled 68 in FIGS. 7 and 8. Accordingly, in this position, sliding surface 48 will contact surface 25 of track 22 between the drive holes 23 thereby providing a pure rail system on the track assembly. Of course, the spacings X and Z may be adjusted between these two limits of the pure rail and pure bogie systems by threading bolts 62 into one of the threaded holes 64 in cylinder 58 between the holes providing the full-up and full-down positions. Further, the present apparatus may be used with other types of tracks. As will be more fully explained below, variation in the spacing of the track from the frame or rail allows adjustment of the amount of track contacting the snow surface as well as enabling variation of the weight transfer characteristics of the particular track assembly.

Another problem overcome with the present invention is that of keeping the track in lateral alignment with the frame members or rails and bogie wheels. With prior art systems such as that shown in FIG. 4, bogie wheels 28 are supported on continuous axles 36 extending between parallel rails 24. Although wheels 28 are mounted both between and laterally outside rails 24, they continually space the track away from the frame. When turning a sled including such a track assembly through a corner, the friction of these wheels, even with the help of the idler and drive wheels, is often not sufficient to keep the track properly aligned. Accordingly, especially in high speed turns, the wheels move laterally across the inside of the track causing the track to be thrown from the assembly.

With the present invention, although the bogie wheels 28 space the track 22 away from the bottom sliding surface 48 of rail 24, lateral alignment of the track 22 with rails 24 is maintained via the lateral contact of guide means comprising portions of the protruding drive lugs 70 with the side surfaces 32 and 34 of rail 24. As shown in FIGS. 3, 7, and 8, each drive hole 23 is outlined by a drive lug 70 including two lateral upstanding side walls 72 which protrude above the surface 25 of track 22 a distance greater than the maximum distance Z between surface 25 and sliding surface 48. Each of these lateral walls 72 has an interior surface 74 which is normally immediately adjacent one of the side surfaces 32 or 34 of the rail 24. During cornering with the snowmobile, when lateral forces are exerted on the track with respect to the position of rail 24, the protruding walls 72 including surfaces 74 slidingly contact the sides 32 and 34 of each rail thereby maintaining longitudinal alignment of the track with the rails. Typically, lugs 70 are riveted to track 22 from the outside surface of the track although other conventional means such as bonding with adhesives and the like may be utilized. Further, flexible tracks having molded protrusions extending above the level of the inside surface 25 and outlining the drive holes 23 may also be used. Other available tracks use separate lugs or protrusions secured to the inside track surface adjacent the rail sides or include continuous slots formed in the thickness of the track below the level of the inside track surface as was mentioned above.

Figure 12:
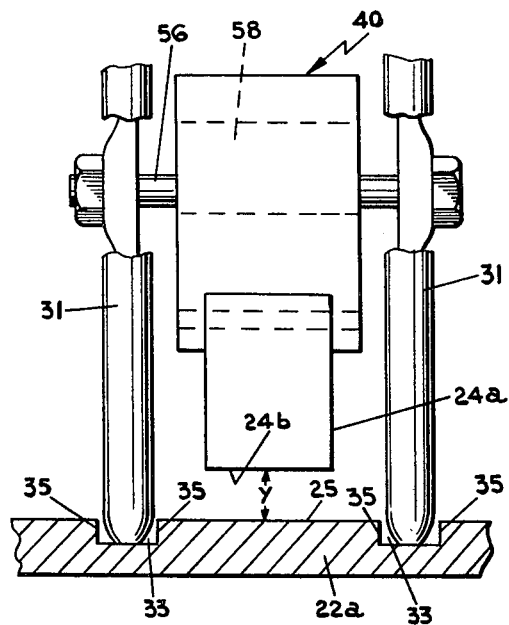
FIG. 12 is a cross-sectional end elevation of another embodiment of the invention wherein the flexible track includes grooves beneath each of the bogie wheels for lateral alignment purposes.
Figure 13:
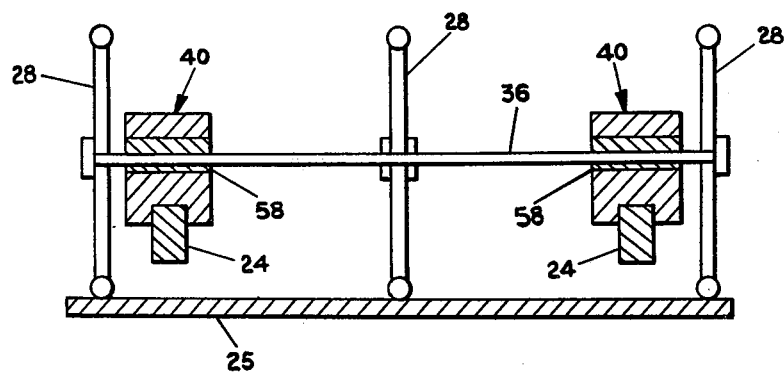
FIG. 13 is a cross-sectional, end view of a conventional track assembly modified to include the eccentric bogie mounting assembly of the presnt invention.
Figure 14:
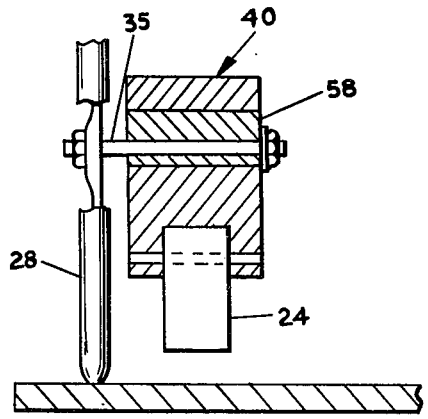
FIG. 14 is a fragmentary, cross-sectional end view of another ocnventional track assembly also modified to include the ecccetric bogie mounting assembly.

An alternative design for holding the track 22 in longitudinal alignment with frame members 24 is shown in FIG. 12. As depicted therein, a mounting block 40 including the eccentrically mounted axle 56 retained in rotational cylinder 58 straddles a generally rectangular frame member 24a. Frame member 24a is of the type which is designed to be spaced from track 22a at all times thereby providing a permanent pure bogie system. This is in contrast to the slide rail 24 described above in FIGS. 1, 2, and 7–9 which may be allowed to slidingly engage the inside surface 25 of track 22 at various times. Block 40 is longitudinally adjustable along the length of frame member 24a while bogie wheels 28 are adjustable with respect to the bottom of frame member 24a in a direction normal to the surface 25 of track 22a at the position where block 40 is secured. The pair of bogie wheels 28 spaces surface 25 or another track portion which the rails would otherwise contact from the bottom 24b of frame member 24a a distance Y. Distance Y is variable via the adjustment of the eccentrically mounted axle 56 in the manner described above for the apparatus in FIG. 9. Thus, the spacing between the track 22a and bottom 24b may be individually adjusted beneath each of the bogie wheel units 30 to facilitate weight transfer to the rear of the snowmobile for quick starts such as in racing.

Lateral alignment of the track with the frame member 24a is maintained by the reception of bogie wheels 28 in grooves or notches 33 recessed into surface 25 of track 22a. Grooves 33 extend substantially parallel to frame member 24a on either side thereof around the entirety of the inside surface 25. Each of the grooves 33 has a substantially rectangular cross-sectional shape such that the side walls and corners of the grooves engage the sides of the tires 31 of bogie wheels 28 thereby counteracting any tendency of the track to move laterally of the rail 24a when the snowmobile is turned through a corner. Square corners 35 where surface 25 meets the grooves 33, prevent the wheels from riding up out of the grooves as the track passes therebeneath. Therefore, as with the contact of the protrusions of drive lugs 70 with the side surfaces of slide rail 24, grooves 33 prevent the lateral misalignment with the track with frame member 24a.

Figure 10:
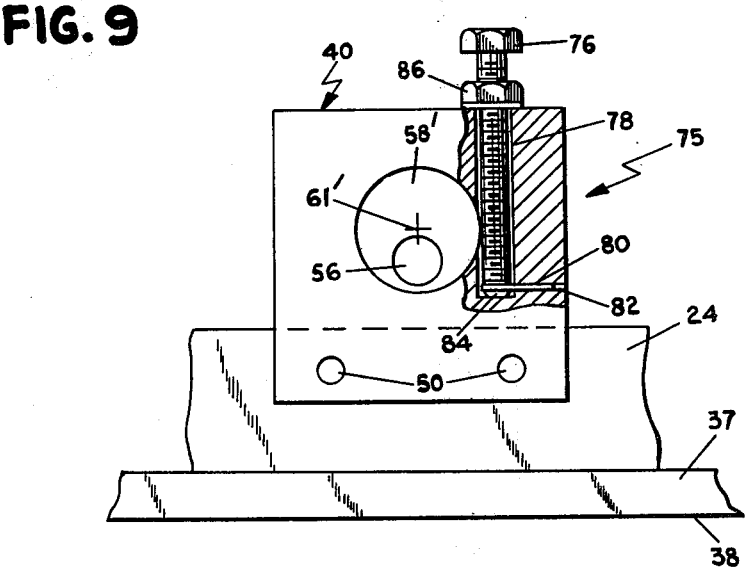
FIG. 10 is a side elevation of a second embodiment of an eccentric bogie wheel mounting assembly.
Figure 11:
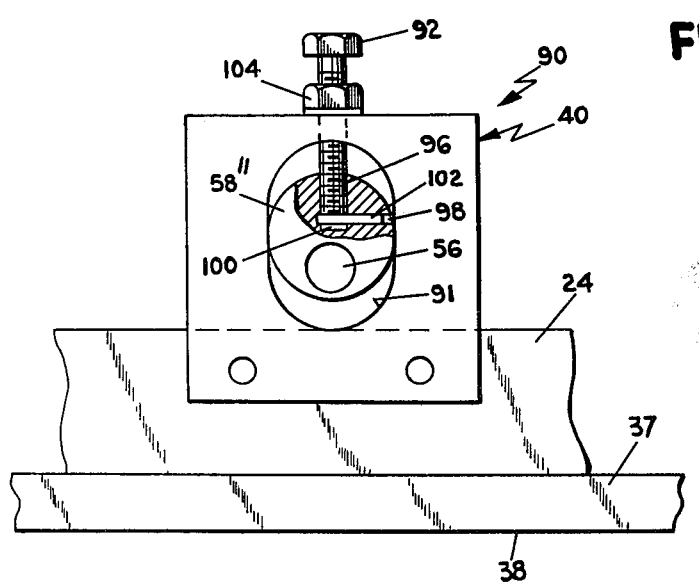
FIG. 11 is a side elevation of a third embodiment of a bogie wheel eccctric mounting assembly.

Referring to FIGS. 10 and 11, alternative bogie wheel mounting units 75 and 90 are illustrated including alternative means for adjusting the rotational position of cylinder 58, and therefore eccentrically mounted axle 56. Other than the means for adjusting the vertical position of axle 56 with respect to the bottom surface of rail 24, the mounting blocks 40 in embodiments 75 and 90 in FIGS. 10 and 11 are exactly similar to that described above in connection with FIGS. 7–9. In FIG. 10, an adjusting bolt 76 is provided extending downwardly through a hole 78 in block 40 generally tangentially one edge of aperture 60 therein. Hole 78 intersects the edge of aperture 60 such that threaded bolt 76 makes contact with the threaded exterior surface of cylinder 58'. As bolt 76 is rotated, the contact between threads on bolt 76 and the threaded exterior surface of cylinder 58' imparts a rotation to cylinder 58' around axis 61. Accordingly, the position of eccentrically mounted axle 56 may be adjusted very accurately by the turning of bolt 76 through a small arc. Bolt 76 is retained in the smooth-walled hole 78 via a pin or clip 80 extending through a passageway 82 into contact with an annular groove or notch 84 provided in the end of bolt 76. Clip 80 allows rotation of bolt 76 without axial movement thereof in the smooth-sided hole 78. A locking nut 86 is provided to lock or secure the bolt 76 in the desired position.

Another alternative assembly 90 for varying the position of axle 56 with respect to the bottom of rail 24 is shown in FIG. 11. An elongated aperture 91 is provided extending transversely through block 40 between the upper surface of the block and the channel 44 therein. Axle retaining cylinder 58'' is fitted within aperture 91 and retained in a desired vertical position via a securing bolt 92. Bolt 92 is received in a threaded aperture 94 extending through the top surface of block 40 and communicating with the aperture 91. Bolt 92 extends into a smooth-sided aperture 96 in the top of clyinder 58'' and is retained therein and allowed to rotate freely via a pin or clip 98 engaging an annular notch or groove 100 formed about the end of bolt 92. Pin or clip 98 is received through a passageway 102 extending perpendicularly to and communicating with the bolt-receiving aperture 96 in cylinder 58''. Rotation of bolt 92 causes an axial displacement of the bolt through aperture 94 thereby raising and lowering cylinder 58'' and axle 56 simultaneously to any position along the vertical height of aperture 91. A locking nut 104 is provided to secure bolt 92 in the desired position. As with the embodiment shown in FIG. 10, the vertical position of the axle 56 with respect to the bottom of frame member or rail 24 may be adjusted very accurately by a small rotation of adjusting bolt 92.

Figure 15:
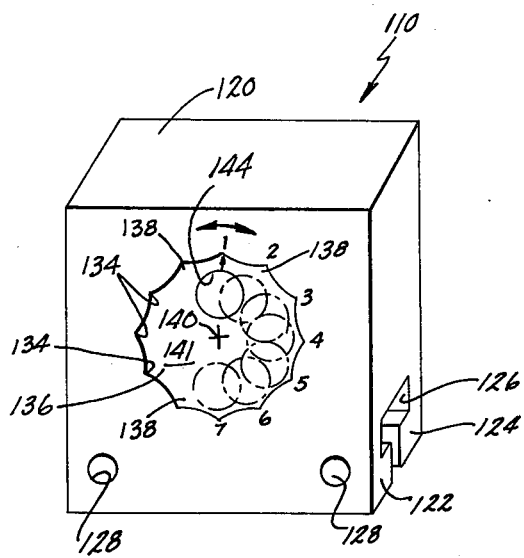
FIG. 15 is a perspective view of another embodiment of the bogie wheel mounting assembly.
Figure 17:
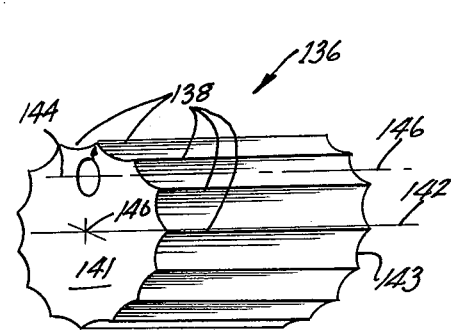
FIG. 17 is a perspective view of the adjusting cylinder included in FIGS. 15 and 16.
Figure 16:
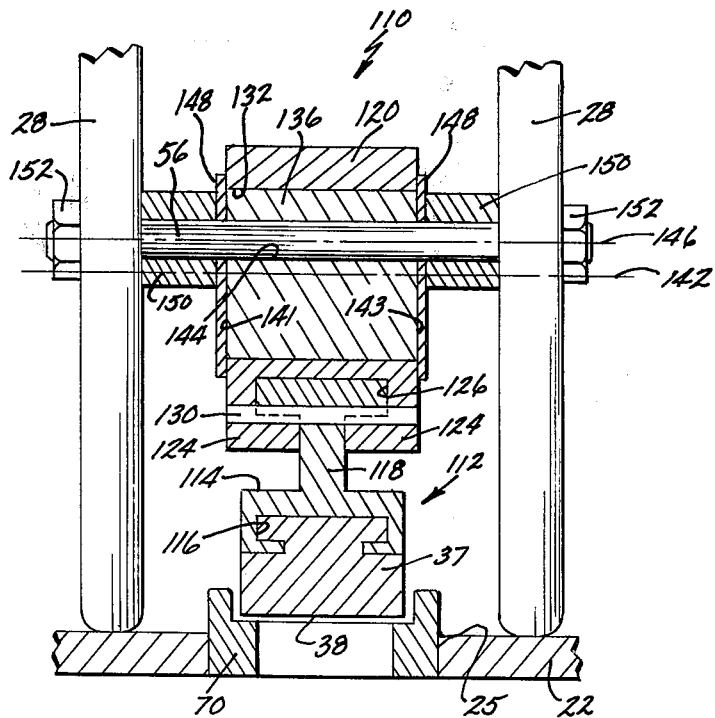
FIG. 16 is a sectional, end view of the mounting assembly of FIG. 15 mounted on a frame member.

Yet another alternative assembly 110 for varying the position of axle 56 with respect to the bottom of the rail of the track assembly is shown in FIGS. 15, 16, and 17. Assembly 110 is adapted to slidably mate with a modified form of slide rail 112. Rail 112 includes lower portion 114 having a T-shaped groove 116 extending along the length of the rail and receiving a mating portion of a strip of "Hi-fax" sliding material 37 with a bottom surface 38. The upper part of slide rail 112 is an elongated, T-shaped portion 118 extending along the entire length of the rail and adapted to cooperate with the bottom of mounting member 120.

Member 120 is a rectangular block including lower L-shaped flanges 122 and 124 forming a generally T-shaped receiving channel 126 for portion 118 of the slide rail. The block includes a pair of spaced, circular apertures or bores 128 extending generally transversely of the direction of the channel 126. The upper portion 118 of the rail 112 includes a series of pairs of apertures therethrough in alignment with the spacing of bores 128. Pins 130 are press fitted through bores 128 and the bores in portion 118 of the rail to secure the block in the desired longitudinal position along the rail (FIG. 16). The block 120 may be slid along the rail and positioned with pins 130 in any of the provided pairs of bores through the rail.

Block 120 also includes a generally transverse aperture 132 having an irregular cross-sectional shape illustrated in FIG. 15. A plurality of generally V-shaped recesses 134 extending across the entirety of the aperture and spaced around the periphery of the aperture are included for mating with portions of a cylinder 136 slidably received therein. Cylinder 136 includes a plurality of generally V-shaped ridges 138 mating with recesses 134 to hold the cylinder against rotation when slidably fitted in aperture 132. Cylinder 136 has a center 140, a longitudinal axis 142 extending through center 140, and parallel end surfaces 141 and 143 defining a cylinder width equivalent to the width of block 120 as shown in FIG. 16. Also included is an axle-receiving bore 144 having a longitudinal axis 146 parallel to, but spaced a predetermined distance from, longitudinal axis 142. Axle 56 comprising an elongated circular, cylindrical rod or cylinder is received in bore 144 thereby causing its longitudinal axis to be offset from the longitudinal axis of the cylinder. Twelve of the mating recesses 134 and ridges 138 are provided in the preferred embodiment allowing the axle to be positioned in seven different vertical positions (FIG. 15).

Cylinder 136 is retained in bore 132 by the combination of a pair of washers 148, a pair of spacer cylinders 150, and bogie wheels 28 secured adjacent spacers 150 by securing bolts 152. Washers 148 are generally planar and have cross-sectional areas larger than the cross-sectional areas of bore 132. The washers include apertures allowing the axle to pass therethrough and abut the side surfaces of the block 120 as well as the end surfaces 141 and 143 of the cylinder 136 when the wheels 28 are properly secured in place adjacent spacers 150. Spacers 150 are cylindrical or tubular members having axle-receiving apertures slightly larger than the outside diameter of axle 56.

As will now be appreciated, a change in position of the bottoms of wheels 128 with respect to the sliding surface 38 of rail 112 is accomplished by removing one of the bogie wheels 28, one of the spacers 150, and one of the washers 148 from one side of the mounting block 120. Cylinder 136 may then be slid from bore 132 and rotated until the arrow at the position of axle-receiving bore 144 is pointing to another of the recesses 134. The recesses are numbered consecutively from 1 to 7 to show the various vertical positions of the axle and thus the spacing of the surface 38 from track surface 25 (FIG. 15). Once reinserted in block 120 in the manner described above, the cylinder is restrained from rotation by the mating ridges 138 and recesses 134. As will be apparent to those skilled in the art, the cross-sectional shape of cylinder 136 and the mating aperture 132 may be other than that shown in FIGS. 15 and 16. Thus, square or rectangular or other shapes may also be used.

Figure 6:
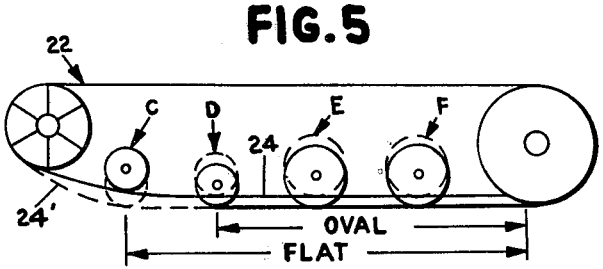
FIG. 6 is a schematic side view of the track assembly of the present invention showing how the assembly may be converted from a pure rail to a pure bogie track supporting system.

As will now be appreciated, the various embodiments of the longitudinally and vertically adjustable mounting assemblies 30 for the independently mounted pairs of bogie wheels 28 allow both the conversion of the entire track assembly from a pure bogie system to a pure rail system as well as allowing adjustment or variation of the length of track which actually contacts the supporting snow surface and supports the vehicle. With reference to FIG. 6, a preferred arrangement of the track assembly includes four bogie wheel units of the type described above mounted on each of the parallel slide rails 24. Each of the slide rails includes an end portion 24' which is curved in an arcuate fashion upwardly away from the plane including the remainder of the bottom surface of rail 24. The curved portion facilitates the movement of the snowmobile over deep, heavy snow since the angle of inclination of portion 24' enables the track assembly to ride up and over snow banks and other obstacles in the terrain. One of the bogie wheel units, denoted C in FIG. 6, is positioned along this curved portion 24 such that the pair of bogie wheels 28 thereon can be raised and lowered in a direction normal to the exterior surface of track 22 at the position where it is located. The raising and lowering of the wheel changes the overall configuration of the track 22 on the assembly from flat to oval and vice versa. Thus, lowering the wheels in the curved portion 24' places more track in contact with the snow. This facilitates control of the snowmobile on ice and at top speeds along straight paths since the frictional contact of the greater track area on the snow provides greater stability and control of the vehicle. Further, the greater area of track in contact with the snow in the flat configuration enables the vehicle to travel over deeper, more heavy snow by spreading the weight thereof over the larger area preventing the vehicle from sinking as deeply into the snow. Of course, depending on the weight and size of the overall machine, a greater or lesser amount of track surface in contact with the snow may be used according to any specific snow conditions.

When the bogie unit C is raised, as shown in the solid lines in FIG. 6, the track 22 is allowed to ride or slide along the bottom surface of the curved portion 24' of frame 24. In this position, the track does not contact the snow until it is approximately under the position of the second bogie unit D. This provides a more oval configuration with less track surface on the snow. The oval configuration faciliates fast starts and the climbing of hills since the lesser frictional contact of the lesser track area contacting the snow means that the track may be moved faster with a given horsepower. Further, the oval configuration is useful for trail riding wherein the angle of inclination of the track sliding against curved portion 24' enables the assembly to more easily pass over objects in the varying terrain encountered in trail use.

The latter three bogie units D, E, and F may be raised and lowered in unison as indicated in FIG. 6 by the solid and phantom lines with the first bogie unit C in either the "up" or "down" position. This enables the entire assembly 10 to be converted from either a pure rail or pure bogie system to one using a combination of both the rail and bogie systems. For example, with unit C in the raised position and units D, E, and F in their lowered positions, the track will contact the rail in the curved portion 24' but will be spaced from the remainder rail under units D, E, and F. Conversely, unit C may be lowered and units D, E, and F raised or all of the units C, D, E, and F may be adjusted to tthe same position. The use of the longitudinal adjustment of the mounting assemblies facilitates all these adjustments since the various bogie units may be variously spaced or clustered depending on whether the sled is to be raced or used for trail riding. Additionally, the closer spacing of the units allows the use of greater numbers of individual bogie units on the rails thereby facilitating a more stable support of the flexible track beneath the bogie wheels.

As mentioned above, the adjustment of the spacing between the rail 24 and the track 22 via the adjustable bogie units 30, 75, 90, or 110 enables the weight transfer characteristics of an individual sled to be modified also. Thus, when bogie unit C in FIG. 6 is lowered, the suspension apparatus, such as that shown at 16 in FIGS. 1 and 2, is forced upwardly into the body of the snowmobile. Upon starting the sled from a stopped position, the greater spacing of the track from the supporting framework in the front of the track assembly causes the weight of the sled to be more efficiently transferred to the rear. Such transfer facilitates fast acceleration. Of course, this effect may be helped by successively lessening the space between the track and the rail as one progresses toward the rear of the assembly through units D, E, and F in FIG. 6. Accordingly, the weight transfer concept depends on the varied spacing of the rail from the track, and therefore may be used in connection with the adjustable bogie units when mounted either on a rail 24 of the type shown in FIGS. 1, 2, and 6–11, which is designed to selectively, slidingly engage the track 22, as well as a frame member 24a of the type shown in FIG. 12 which is designed to remain spaced from the track 22 at all times.

Figure 4:
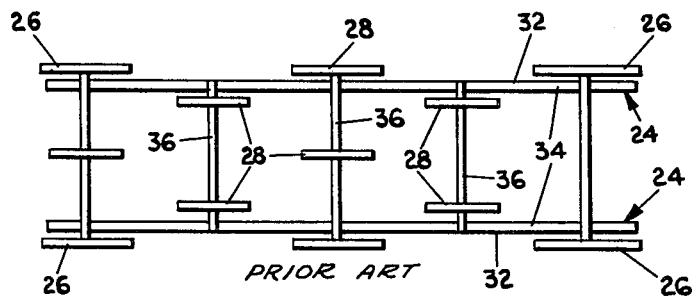
FIG. 4 is a plan view of tthe specific arrangement of supporting bogie and idler wheels of a prior known track assembly.

The apparatus of the present invention may also be used with conventional track assemblies such as those shown in FIGS. 4 and 5 to both provide adjustment of the spacing between the endless track and the frame or rails supporting the bogie wheels and to convert between pure rail and pure bogie systems. With these assemblies, the mounting blocks 40 are used in a manner similar to that shown in FIGS. 7–12, 15, and 16 except that different axles are substituted for axles 56. With the track assembly of FIG. 4, each continuous axle 36, extending between tht two rails or frame members 24 and having several bogie wheels mounted thereon both outboard and inboard or between the frame members, is inserted through cylinders 58, 58', 58'', or 136 in two blocks 40 mounted oppositely each other on the frame members. Cylinders 58 are then rotated or moved in unison to move the entire axle 36 relative to the frame members whereby adjustment of the above spacing is effected.

Similarly, with the track assembly of FIG. 5, stub axles 35 including single bogie wheels are each inserted through cylinders 58, 58', 58'', or 136 of a single mounting block 40 mounted on a single rail or frame member such that the bogie wheels extend outboard of the rails as is illustrated. Each stub axle 35 and single outboard bogie wheel is then adjusted individually of all the others to adjust the above-mentioned spacing. Any of the adjustment mechanisms in FIGS. 9–11, 15, 16, and 17 may be used to adjust and secure cylinders 58, 58', 58'', or 136 in these arrangements.

The present inventive track assembly for snowmobiles provides a convenient means for converting a single assembly from a pure bogie to a pure rail support system as well as into combinations of the two systems. The assembly may be conveniently adjusted to facilitate either racing or recreational trail use, and is designed to prevent excessive and uneven wear of the sliding surfaces of the supporting rails or framework when adjusted to the bogie system.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiment of the invention in which an exclusive property or privilege is claimed, are defined as follows:

1. Apparatus for mounting bogie wheels on an elongated frame member of a snowmobile track assembly, said frame member having side and bottom surfaces and adapted to support means for movably supporting a flexible, endless track in a closed loop longitudinally around the ends of said frame member; said apparatus comprising means for rotatably mounting at least one bogie wheel on such a frame member; said mounting means including means for securing said bogie wheel in different positions with respect to such a frame member when mounted thereon whereby the position of said bogie wheel relative to said bottom surface of said frame member is selectively adjustable; said securing means including a support member having means for mounting said member on the frame member, an aperture having a noncircular cross section extending through said support member is a direction generally transverse to the frame member when the support member is mounted thereon, a cylinder having a noncircular cross-sectional shape mating with said aperture and slidably mounted in said aperture; said cylinder and aperture including means for preventing rotation of said cylinder in said aperture; means for rotatably mounting said bogie wheel on said cylinder; and means for retaining said cylinder in said support member.

2. The apparatus of claim 1 wherein said mounting means includes means for slidably adjusting the position of said support member along the length of such a frame member.

3. The apparatus of claim 2 wherein the frame member is a rail having a predetermined cross-sectional shape; said support member including a channel in the bottom thereof extending transversely of said aperture, said channel having a cross-sectional shape mating with the shape of the rail; pin means extending through said channel and the rail for securing said support member to the rail.

4. The apparatus of claim 1 wherein said rotation preventing means include at least one elongated ridge on said cylinder; said aperture including at least two elongated recesses for mating with said ridge, said recesses being spaced about the periphery of said aperture whereby said cylinder is removable for positioning said ridge with either of said recesses to variously position said bogie wheel.

5. The apparatus of claim 4 wherein said cylinder includes a longitudinal axis through its center and an axle having a longitudinal axis extending parallel to said cylinder axis, said axle axis spaced a distance from said cylinder axis; said bogie wheel being mounted for rotation on said axle; said cylinder-retaining means including a washer having a cross-sectional area larger than said aperture located over the end of said cylinder and against one surface of said support member and spacing means extending between said bogie wheel and said washer for holding said washer against said support member.

6. The apparatus of claim 5 wherein said axle extends on either side of said cylinder and support member; a bogie wheel, washer and spacing means being mounted adjacent and against either end of said cylinder.

7. In an apparatus for movably supporting tracked vehicles including snowmobiles and the like having a pair of elongated, substantially parallel frame members with bottom and side surfaces, idler whheels rotatably mounted generally adjacent either end of said frame members, and a flexible, endless track having exterior and interior surfaces for continuous engagement with a supporting surface for said vehicle, said track extending longitudinally around said frame members and supported for movement therearound on said idler wheels; at least one bogie wheel and means for mounting said bogie wheel along the length of at least one of said frame members; said bogie wheel rotatably engaging and spacing a portion of said track adjacent thereto a predetermined distance away from said bottom of said frame member for support of said vehicle above said supporting surface; the improvement comprising means for securing said bogie wheel in different positions with respect to said frame member; said securing means including a support member, means for securing said support member on one of said frame members, an axle receiving said bogie wheel, and axle-supporting means inserted in said support member for supporting said axle in one of at least two fixed positions; means for locating said axle at a fixed position on said axle-supporting means; said axle-supporting means including means projecting therefrom for preventing rotation of said axle-supporting means when inserted in said support member whereby said projecting means and axle-supporting means hold said axle and bogie wheel in a predetermined position to space said track from said frame member as desired.

8. The apparatus of claim 7 wherein the ends of said frame members which are forwardmost when said apparatus is installed in said vehicle are curved upwardly out of the plane including the bottoms of the remainder of said frame members; said bogie wheel being positioned along said curved end portion of the said frame member; said securing means providing a means for selectively forcing greater or lesser amounts of said track against said supporting surface.

9. The apparatus of claim 7 wherein said mounting means includes means for slidably adjusting the position of said support member along the length of such a frame member.

10. In an apparatus for movably supporting tracked vehicles including snowmobiles and the like having a pair of elongated, substantially parallel frame members with bottom and side surfaces, idler wheels rotatably mounted generally adjacent either end of said frame members, and a flexible, endless track having exterior and interior surfaces for continuous engagement with a supporting surface for said vehicle, said track extending longitudinally around said frame members and supported for movement therearound on said idler wheels; at least one bogie wheel and means for mounting said bogie wheel along the length of at least one of said frame members; said bogie wheel rotatably engaging and spacing a portion of said track adjacent thereto a predetermined distance away from said bottom of said frame member for support of said vehicle above said supporting surface; the improvement comprising means for securing said bogie wheel in different positions with respect to said frame member; said securing means including a support member, means for securing said support member on one of said frame members, an axle receiving said bogie wheel, and axle-supporting means inserted in said support member for supporting said axle in one of at least two fixed positions; said axle-supporting means including means projecting therefrom for preventing rotation of said axle-supporting means when inserted in said support member; said mounting means including means for slidably adjusting the position of said support member along the length of such a frame member; said frame member including a rail having a predetermined cross-sectional shape; said support member including a channel in the bottom thereof extending transversely of said axle, said channel having a cross-sectional shape mating with the shape of the rail; pin means extending through said channel and the rail for securing said support member to the rail.

11. In an apparatus for movably supporting tracked vehicles including snowmobiles and the like having a pair of elongated, substantially parallel frame members with bottom and side surfaces, idler wheels rotatably mounted generally adjacent either end of said frame members, and a flexible, endless track having exterior and interior surfaces for continuous engagement with a supporting surface for said vehicle, said track extending longitudinally around said frame members and supported for movement therearound on said idler wheels; at least one bogie wheel and means for mounting said bogie wheel along the length of at least one of said frame members; said bogie wheel rotatably engaging and spacing a portion of said track adjacent thereto a predetermined distance away from said bottom of said frame member for support of said vehicle above said supporting surface; the improvement comprising means for securing said bogie wheel in different positions with respect to said frame member; said securing means including a support member, means for securing said support member on one of said frame members, an axle receiving said bogie wheel, and axle-supporting means inserted in said support member for supporting said axle in one of at least two fixed positions; said axle-supporting means including means projecting therefrom for preventing rotation of said axle-supporting means when inserted in said support member; said support member including an aperture having a noncircular cross section extending therethrough in a direction transverse to said frame member; said axle-supporting means comprising a cylinder having a noncircular cross-sectional shape mating with said aperture and slidably mounted in said aperture; means for retaining said cylinder in said support member whereby said projecting means and axle-supporting means hold said axle and bogie wheel in a predetermined position to space said track from said frame member as desired.

12. The apparatus of claim 11 wherein said projecting means include at least one elongated ridge on said cylinder; said aperture including at least two elongated recesses for mating with said ridge, said recesses being spaced about the periphery of said aperture whereby said cylinder is removable for positioning said ridge with either of said recesses to variously position said axle and said bogie wheel.

13. The apparatus of claim 12 wherein said cylinder includes a longitudinal axis through its center, said axle having a longitudinal axis extending through its center; and axle axis being parallel to said cylinder axis and spaced from said cylinder axis.

14. The apparatus of claim 13 wherein said cylinder retaining means including a washer having a cross-sectional area larger than said aperture located over the end of said cylinder and against one surface of said support member and spacing means extending between said bogie wheel and said washer for holding said washer against said cylinder and support member.

15. The apparatus of claim 14 wherein said axle extends on either side of said cylinder and support member; a bogie wheel, washer, and spacing means being mounted adjacent and against either end of said cylinder.

* * * * *

UNITED STATES PATENT AND TRADEMARK OFFICE
CERTIFICATE OF CORRECTION

PATENT NO. : 3,948,331
DATED : April 6, 1976
INVENTOR(S) : Richard E. Esch

It is certified that error appears in the above-identified patent and that said Letters Patent are hereby corrected as shown below:

Column 1, line 19;
    "framewoks" should be --frameworks--;
Column 1, line 59;
    "founr dhat" should be --found that--;
Column 1, line 66;
    "terrin" should be --terrain--;
Column 2, line 24;
    "twith" should be --with--;
Column 2, line 25;
    "fo" should be --for--;
Column 2, line 34;
    "ast" should be --at--;
Column 2, line 61;
    "pair" should be --pairs--;
Column 3, line 5;
    "purpose" should be --purposes--;
Column 3, line 8;
    "sutdy" should be --study--;
Column 3, line 11;
    "fragment" should be --fragmentary--;
Column 3, line 20;
    "tthe" should be --the--;
Column 3, line 30;
    "portionsn" should be --portions--;
Column 3, line 50;
    "presnt" should be --present--;
Column 3, line 52;
    "ocnventional" should be --conventional--;
Column 4, line 47;
    "3" should be --32--;
Column 6, line 5;
    "both" should be --bolt--;

UNITED STATES PATENT AND TRADEMARK OFFICE
CERTIFICATE OF CORRECTION

PATENT NO. : 3,948,331
DATED : April 6, 1976
INVENTOR(S) : Richard E. Esch

It is certified that error appears in the above-identified patent and that said Letters Patent are hereby corrected as shown below:

Column 8, line 33;
    "clyinder" should be --cylinder--;
Column 8, line 53;
    After "includes" insert --a--;
Column 10, line 62;
    "tthe" should be --the--;
Column 12, line 6;
    "embodiment" should be --embodiments--;
Column 13, line 5 (Claim 7);
    "whheels" should be --wheels--.

Signed and Sealed this

Sixth Day of July 1976

[SEAL]

Attest:

RUTH C. MASON
*Attesting Officer*

C. MARSHALL DANN
*Commissioner of Patents and Trademarks*